United States Patent [19]
Takahashi et al.

[11] 3,986,408
[45] Oct. 19, 1976

[54] VARIABLE RATIO VEHICLE STEERING GEAR

[75] Inventors: Koichi Takahashi, Yokohama; Nobuteru Hitomi; Tokiyoshi Yanai, both of Yokosuka, all of Japan

[73] Assignee: Nissan Motor Co., Ltd., Yokohama, Japan

[22] Filed: June 12, 1975

[21] Appl. No.: 586,364

Related U.S. Application Data

[63] Continuation-in-part of Ser. No. 407,200, Oct. 17, 1973, abandoned.

[30] Foreign Application Priority Data
Oct. 18, 1972 Japan .............................. 47-104260

[52] U.S. Cl. .................................. 74/499; 29/159.2
[51] Int. Cl.² ...................... B62D 1/20; B21D 53/28
[58] Field of Search .............. 74/499, 498; 29/159.2

[56] References Cited
UNITED STATES PATENTS

| | | |
|---|---|---|
| 2,159,225 | 5/1939 | Phelps et al. ......................... 74/499 |
| 2,953,932 | 9/1960 | Lincoln ............................ 74/499 X |
| 3,505,899 | 4/1970 | Dye ....................................... 74/499 |
| 3,810,399 | 5/1974 | Schluckebier et al. ........... 74/499 X |

*Primary Examiner*—Leonard H. Gerin

[57] ABSTRACT

Basic pitch curves of a ball nut rack and sector gear of a recirculating ball type steering gear have basic pitch curves which provide a gear ratio which is a desired function of the degree of turn of the steering wheel. The teeth of the rack are formed on a stepped reference line which is different from its basic pitch curve.

6 Claims, 8 Drawing Figures

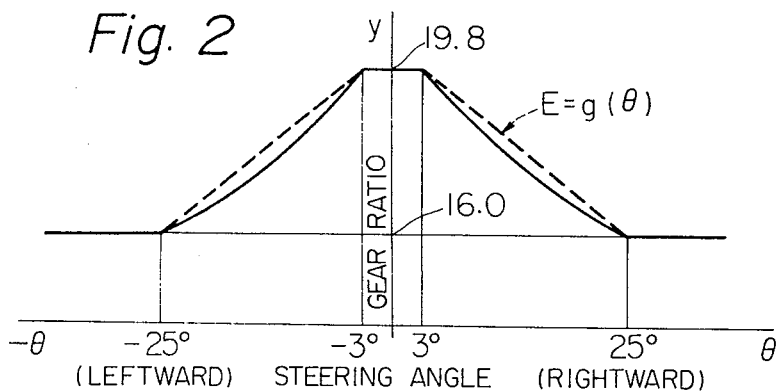
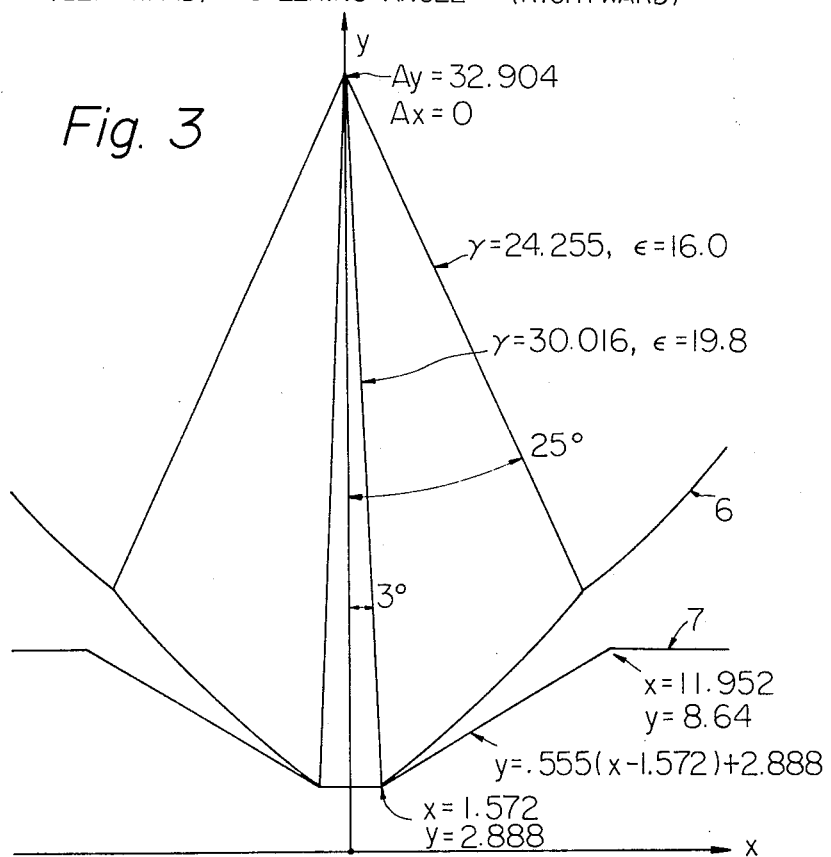

VARIABLE RATIO VEHICLE STEERING GEAR

This invention is a continuation-in-part of the application Ser. No. 407,200, filed Oct. 17, 1973, and now abandoned.

This invention relates to a new and improved method of producing the teeth of a rack of a variable ratio steering gear for a motor vehicle.

A recirculating ball type steering gear generally has a worm shaft which is connected to a steering shaft of the motor vehicle and which also has an external helical groove formed thereon between axial ends thereof. The worm shaft receives axially movably thereon a hollow nut having an internal helical groove formed therein and aligned with the adjacent external helical groove of the worm shaft in such a manner that the adjacent helical grooves of the worm shaft and nut form a ball circuit receiving balls therein which roll through the ball circuit of helical grooves of the worm shaft and nut as the worm shaft is rotated with the steering wheel and accordingly the steering shaft so that the nut meshing with the steering shaft through the balls is moved parallel to an axis of rotation of the worm shaft. The nut on the worm shaft has external teeth or a rack formed thereon which meshes with a sector gear through external teeth formed thereon and is rotatable around a pitman arm shaft perpendicular to the axis of the steering shaft so that longitudinal movement of the nut along the worm shaft rotates the sector gear as the steering wheel and accordingly the steering shaft is rotated.

It is well known in the art of steering gears for motor vehicles that for the purpose of satisfactory operation under various driving conditions, the steering gears must provide stability of steering during high speed straight ahead driving and smooth manipulation of steering at relatively low speed such as in garaging or turning. For this reason, a variable ratio steering gear provides a high steering ratio at a central position of the steering wheel and a decreasing ratio as the wheel is displaced from the central position. A number of variants working on this particular principle have thus far been developed and put into practical use in modern motor vehicles. A prior art steering gear of recirculating ball type as mentioned above has had a rack the teeth of which are formed on a straight basic or reference line which is provided parallel to the steering shaft and adjacent to the basic pitch curve of the rack provided on the basis of the above-mentioned variable gear ratios. Alternatively, the prior art steering gear has had a rack the teeth of which is formed on a curved reference or basic line provided closely approximate to the aforesaid basic pitch curve of the rack. As a consequence, though the former has advantages in that it facilitates easy design of the teeth of the rack and measurement of their accuracy, there exist portions where the reference line of the teeth of the rack is apart from the basic pitch curve of the rack. Accordingly, if the teeth of the sector gear are generated by a cutting tool of the same profile as that of the teeth of the rack, undercutting of the roots of the teeth of the sector gear or tapering of the tops of teeth of the sector gear tends to occur. Thus, the former has a disadvantage in that a large variation in the gear ratio cannot be realized. On the other hand, though the latter has an advantage that since the curved reference line of the teeth of the rack is not greatly apart from the basic pitch curve of the rack, the teeth of the sector gear generated by a rack-shaped cutting tool can be formed into approximately optimum profiles, it has a disadvantage in that it involves intricacy in design and engineering of the rack and also in measuring its accuracy and, therefore is not fully acceptable for practical purposes.

It is, therefore, an object of the present invention to provide a new and improved method of producing the teeth of a rack of a variable ratio steering gear in which the gear ratio is continuously variable as the steering wheel and accordingly the steering shaft are turned.

It is another object of the present invention to provide a new and improved method of producing the teeth of a rack of a variable ratio steering gear in which method design of the teeth of the rack and measurement of their accuracy are easy.

It is still another object of the invention to provide a new and improved method of producing the teeth of a rack of a variable ratio steering gear which prevents the creation of undercuts of the roots of teeth of the sector gear or tapering of the tops of the teeth of the sector gear.

It is still another object of the invention to provide a new and improved method of producing the teeth of a rack of a variable ratio steering gear which has a sector gear having teeth with approximately optimum profiles.

It is still another object of the invention to provide a new and improved method of producing the teeth of a rack of a variable ratio steering gear which achieves steering gear ratios of large variation.

These and other objects, features and advantages of a steering gear the rack teeth of which is produced by a method according to the present invention will become more apparent from the following description taken in conjunction with the accompanying drawings, in which like reference numerals and characters designate corresponding parts and components and in which:

FIG. 2 is a graph showing a steering gear ratio as a function of the angular position of the sector gear;

FIG. 3 is an analytic view schematically showing the relationship between the basic pitch curves of a rack and sector gear in mesh with each other;

Figure 1:
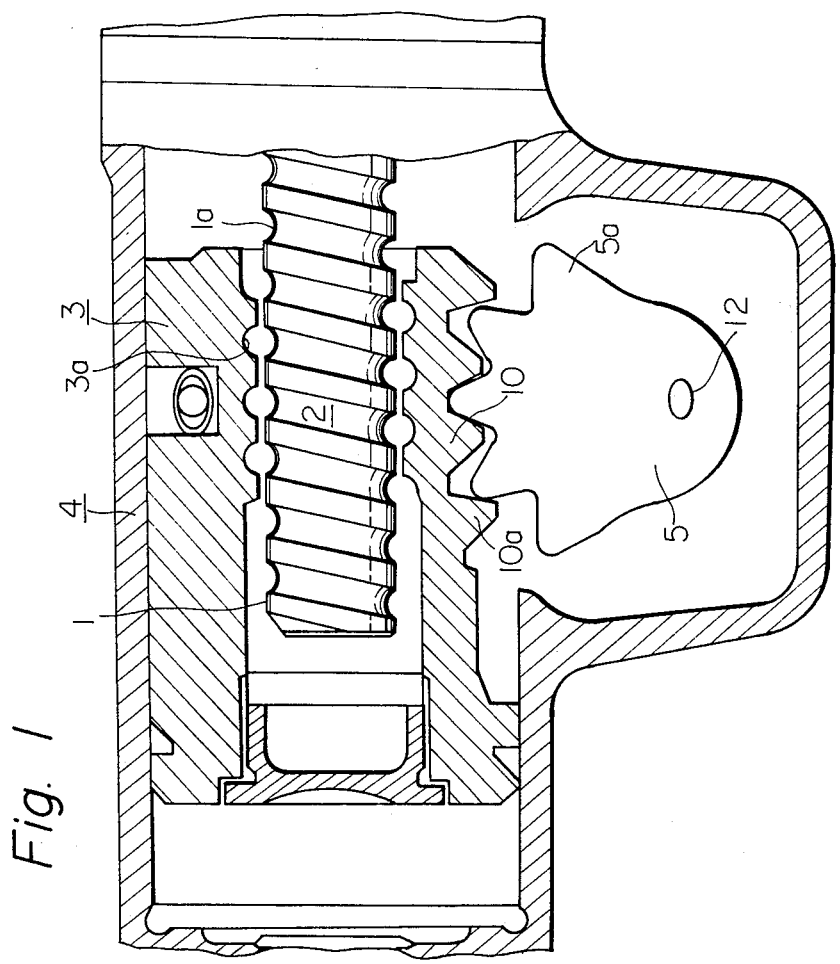
FIG. 1 is a longitudinal sectional view of a preferred embodiment of the steering gear the rack teeth of which is produced by the method according to the present invention.

Referring now to FIG. 1, the steering gear is shown as being of a recirculating ball type, although any other type having a rack and a sector gear may be adapted. A housing 4 rotatably supports a worm shaft 1 therein which is connected to a steering shaft and steering wheel of the vehicle, although not shown. A nut 3 is disposed over the worm shaft 1 to move therealong. A helical ball circuit (not designated) is defined by helical grooves 1a and 3a in the worm shaft 1 and nut 3 respectively in which balls 2 circulate. A segment rack 10 is formed on the nut 3 for longitudinal movement therewith. The rack 10 has two other teeth 10a having a shape symmetric with respect to a center line 11 of the rack 10 and two inner teeth 10b located between the outer teeth 10a and adjoining each other and having a shape symmetric with respect to the center line 11. Each of the inner and outer teeth 10a and 10b has inner and outer flat tooth surfaces. The pressure angles $a_1$, $a_2$ and $a_4$ of the inner and outer tooth surfaces of each of the inner teeth 10b and the outer tooth surface of each of the outer teeth 10a are larger than the pressure angle $a_3$ of the inner tooth surface of each of the outer teeth 10a and the pressure angle $a_3$ of the inner tooth surface of each of the outer teeth 10a is considerably small. A sector gear 5 is carried on a rock shaft 12 transversely mounted in the housing 4 and has teeth 5a which mesh with the teeth 10a and 10b of the rack 10. The rock shaft 12 is attached to a pitman arm of the vehicle although not shown. The configuration is well known, and as the steering wheel is turned, the pitman arm is also turned through the worm shaft 1, balls 2, rack 10, sector gear 5 and rock shaft 12. The gear ratio between the worm shaft 1 and rock shaft 12 is designated as E, and in the invention is maximum at a central position of the sector gear 5 at which the bisector of the sector gear 5 is perpendicular to the axis of the worm shaft 1, and symmetrically decreases as the sector gear 5 is rotated from its central position.

FIG. 2 shows an example of the steering gear ratio E as a desired function $g(\theta)$ of the angle of rotation $\theta$ of the sector gear 5 from its central position. In this example, the steering gear ratio E is 19.8 between 0° and |3°| of rotation of the sector gear 5 from its central position, linearly decreases between |3°| and |25°|, and 16.0 beyond |25°|, as shown in broken line. Any function, however, may be provided such as shown in solid line. In general, the steering gear ratio E may be expressed either as a function of the angle of rotation of the steering wheel or the sector gear 5, and the latter designation is herein used.

Basic pitch curves 7 and 6 of the rack 10 and the sector gear 5 providing the desired function $E = g(\theta)$ of the steering gear ratio E at a given angle $\theta$ of the sector gear 5 are determined by the following general equations:

$$\text{segment rack 10 } x(\theta) = \frac{L}{2\pi} \int_0^\theta g(\theta) \, d\theta \quad (1)$$

$$y(\theta) = A - \frac{L}{2\pi} g(\theta) \quad (2)$$

sector gear 5

$$r(\theta) = \frac{L}{2\pi} g(\theta) \quad (3)$$

$$r[x(\theta)] = A - y(x) \quad (4)$$

in which $x(\theta)$ and $y(\theta)$ are the coordinates of the basic pitch curve 7 of the segment rack 3 in a rectangular coordinate system having its abscissa colinear with the axis of the worm shaft 1 and its ordinate passing through the center of the basic pitch curve 7 of the segment rack 10;

$r(\theta)$ is the radial distance between the center of the rock shaft 12 and the basic pitch curve 6 of the sector gear 5 at a given angle $\theta$;

$r[x(\theta)]$ is the numerical value of $r(\theta)$ corresponding to a given value of $x(\theta)$;

A is the perpendicular distance between the center of the rock shaft 12 and the axis of the worm shaft 1; and L is the lead of the worm shaft 1.

For illustrative purposes only, a numerical presentation of the method of computation will now be given, as shown in FIG. 3. (In arbitrary units).

Let
$A = 32.904$
$L = 9.5251$
$g(\theta) = 19.8 \ (0° < \theta < 3°) = 20.323 - 9.99\theta \ (3° < \theta < 25°) = 16.0 \ (25° < \theta)$ $x(3°) = 1.572$ $y(3°) = 2.888$ $a = 20.323$ $b = 9.99$ $$\therefore g(\theta) = a - b\theta \ (3° < \theta < 25°) \quad (5)$$

From eq. (1)

$$x(\theta) = \frac{L}{2\pi} \int_0^\theta g(\theta) d\theta \quad \text{or}$$

$$x(\theta) = \left[ \frac{G1L}{2\pi} \int_{3°}^\theta g(\theta) d(\theta) \right] + x(3°)$$

Substitution of equ. (5) and integration provides:

$$x(\theta) = \frac{L}{2\pi} \left\{ a(\theta - 3°) - \frac{b}{2}[\theta^2 - (3°)^2] \right\} + x(3°) \quad (6)$$

For $\theta = 25°$, substitution of the numerical values into equ. (6) provides $x(25°) = 11.952$ From equ. (2), $$y(\theta) = A - \frac{L}{2\pi} g(\theta),$$

Since $g(\theta)$ is 16.0 at $\theta = 25°$, substitution provides $y(25°) = 8.64$ Since the basic pitch curve 7 of the rack 10 is a straight line for $3° < \theta < 25°$, $y(\theta)$ must have the form $y(\theta) = K x(\theta) + y(3°)$ where $K$ is a constant equal to $$K = \frac{y(25°) - y(3°)}{x(25°) - y(3°)}$$

Numerical substitution provides $K = 0.555$ and $$y(\theta) = 0.555 \, x(\theta) + 2.888 \quad (7)$$

From equ. (3), $$r(\theta) = \frac{L}{2\pi} g(\theta);$$

numerical substitution provides $$r(\theta) = 30.81 - 15.14\theta \qquad (8)$$

Solution of equ. 8 for $\theta = 23°$ and $25°$ provides $r(3°) = 30.016$ and
$r(25°) = 24.255$ The same results can be obtained from equ. (4).

Figure 4:
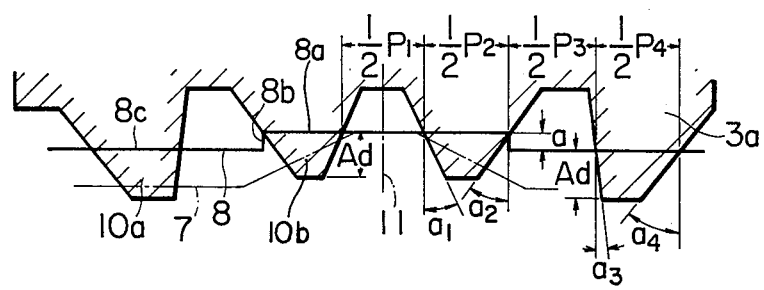
FIG. 4 is an analytic view schematically showing the relationship between the basic pitch curve, reference line and teeth of a rack of a preferred embodiment of a steering gear of the present invention.
Figure 5:
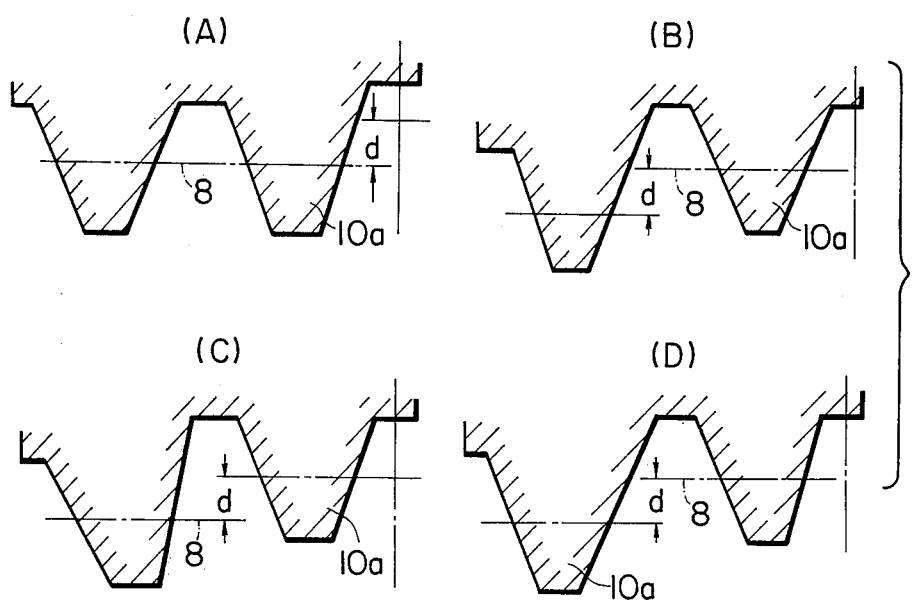
FIGS. 5A to 5D are explanatory views schematically showing the reference lines of various preferred embodiments of steering gears of the present invention.

In accordance with the invention, the teeth 10a of the rack 10 are produced by providing a stepped reference line 8 different from the basic pitch curve 7 of the rack 10 and by forming the teeth of the rack on the stepped reference line 8, as is clearly shown in FIGS. 4 and 5. The stepped reference line 8 comprises a first straight longitudinal line and in parallel with the axis of the worm shaft 1 and symmetric with respect to the center line 11 and touching at the center line 11 the basic pitch curve 7 of the rack 10, two straight step lines 8b extending respectively from both ends of the longitudinal line 8a perpendicularly to the same and away from the axis of the worm shaft 1 and having the same length d, and second and third straight longitudinal lines 8c extending respectively from leading ends of the step lines 8b in parallel with the first longitudinal line 8a and away from the same. The inner teeth 10b of the rack 10 are formed on the first longitudinal line 8a symmetrically with respect to the center line 11. The addendum Ad of the inner teeth 10b is selected to limit below a predetermined extent undercut created in the root of a tooth of a sector gear generated by a cutter having the same tooth as the inner tooth 10b. The outer teeth 10a of the rack 10 are formed on the second and third longitudinal lines 8c symmetrically with respect to the center line 11. The outer teeth 10a has the same addendum as the addendum Ad of the inner teeth 10b. The distance of the tooth crest of the outer tooth 10a from the first longitudinal line 8a is larger than the addendum Ad of the inner tooth 10b and is selected to limit below a predetermined extent undercut created in the root of a tooth of a sector gear generated by a cutter having the same tooth as the outer tooth 10a. Since the pitch curves 6 and 7 are conjugate at all angular positions of the sector gear 5, the teeth of the gear 5 and rack 10 mesh without interference. The teeth 10a of the rack 10 may be formed with equal pitch and pressure angles, or with unequal pitch and pressure angles as shown in FIG. 4. The characters $P_1$, $P_2$ ect. designate the pitches of the teeth 10a and 10b of the rack 10.

Thus, the invention provides a steering gear in which the ratio can be provided as any desired function of the rotation of the steering wheel and thus the sector gear 5, and the rack 10 and sector gear 5 will mesh smoothly at all positions thereof.

A variable ratio steering gear the rack teeth of which is produced by the method according to the invention has the following various advantages that a sector gear produced by a rack-shaped cutting tool has a natural or unaffected tooth profile and is produced with the strength retaining its balance, the tooth profile of the rack is easily designed which retains contact ratio which does not occur undercuts of the roots of the sector gear even if variations in the gear ratio are increased so that degree of freedom in design the tooth profile of the rack is increased, and manufacture and measurement of the rack teeth are easy.

What is claimed is:

1. In a motor vehicle variable ratio steering gear comprising a worm shaft having a worm, a nut on said worm shaft in engagement with said worm for axial movement thereon upon rotation of said worm shaft and having a rack on one side, said rack having two outer teeth having a shape symmetric with respect to a center line of said rack and two inner teeth located between said outer teeth and adjoining each other and having a shape symmetric with respect to said center line, a rock shaft extending transversely to said worm shaft, and a sector gear mounted on said rock shaft and having teeth in engagement with said teeth of said rack, a method of forming said teeth of said rack, comprising the steps of providing a stepped reference line different from a basic pitch curve of said rack, said stepped reference line comprising a first straight longitudinal line extending from said center line in opposite directions and in parallel with the axis of said worm shaft, two straight step lines extending respectively from both ends of said longitudinal line perpendicularly to the same and away from said axis of said worm shaft and having the same length, and second and third straight longitudinal lines extending respectively from leading ends of said step lines in parallel with said first longitudinal line and away from the same, forming said inner teeth on said first longitudinal line symmetrically with respect to said center line, the addendum of said inner teeth being selected to limit below a predetermined extent undercut created in the root of a tooth of a sector gear generated by a cutter having the same tooth as said inner tooth, and forming said outer teeth on said second and third longitudinal lines symmetrically with respect to said center line, said outer teeth having the same addendum as said addendum of said inner teeth the distance of the tooth crest of each of said outer teeth from said first longitudinal line being larger than said addendum of said inner teeth and being selected to limit below a predetermined extent undercut created in the root of a tooth of a sector gear generated by a cutter having the same tooth as said outer tooth.

2. In a motor vehicle variable ratio steering gear comprising a worm shaft having a worm, a nut on said worm shaft in engagement with said worm for axial movement thereon upon rotation of said worm shaft and having a rack on side, said rack having two outer teeth having a shape symmetric with respect to a center line of said rack and two inner teeth located between said outer teeth and adjoining each other and having a shape symmetric with respect to said center line, each of said inner and outer teeth having flat inner and outer tooth surfaces, the pressure angles of said inner and outer tooth surfaces of each of said inner teeth and said outer tooth surface of each of said outer teeth being larger than the pressure angle of said outer teeth and the pressure angle of said inner tooth surface of each of said outer teeth being considerably small, a rock shaft extending transversely to said worm shaft, and a sector gear mounted on said rock shaft and having teeth in engagement with said teeth of said rack a method of forming said teeth of said rack, comprising the steps of providing a stepped reference line different from a basic pitch curve of said rack, said stepped reference line comprising a first straight longitudinal line extending from said center line in opposite directions and in parallel with the axis of said worm shaft and symmetric with respect to said center line and touching at said center line said basic pitch curve of said rack, two straight step lines extending respectively from both ends of said longitudinal line perpendicularly to the same and away from said axis of said worm shaft and having the same length, and second and third straight longitudinal lines extending respectively from leading ends of said step lines in parallel with said first longitudinal line and away from the same, forming said inner teeth on said first longitudinal line symmetrically with respect to said center line, the addendum of said inner teeth being selected to limit below a predetermined extent undercut created in the root of a tooth of a sector gear generated by a cutter having the same tooth as said inner tooth, and forming said outer teeth on said second and third longitudinal lines symmetrically with respect to said center line, said outer teeth having the same addendum as said addendum of said inner teeth, the distance of the tooth crest of each of said outer teeth from said first longitudinal line being larger than said addendum of said inner teeth and being selected to limit below a predetermined extent undercut created in the root of a tooth of a sector gear generated by a cutter having the same tooth as said outer tooth.

3. A method as claimed in claim 2, in which said teeth of said rack are formed with equal pitch and chordal thickness.

4. A variable ratio steering gear for a motor vehicle, comprising a worm shaft having a worm, a nut on said worm shaft in engagement with said worm for axial movement thereon upon rotation of said worm shaft and having a rack on one side, a rock shaft extending transversely to said worm shaft, and a sector gear mounted on said rock shaft and having teeth in engagement with the teeth of said rack, said teeth of said rack being formed on a stepped reference line different from a basic pitch curve of said rack, said stepped reference line comprising a first straight longitudinal line extending from a center line of said rack in opposite directions and in parallel with the axis of said shaft, two straight step lines extending respectively from both ends of said longitudinal line perpendicularly to the same and away from said axis of said worm shaft and having the same length, and second and third straight longitudinal lines extending respectively from leading ends of said step lines in parallel with said first longitudinal line and away from the same, said teeth of said rack comprising two inner teeth formed on said first longitudinal line symmetrically with respect to said center line and having the same addendum selected to limit below a predetermined extent undercut created in the root of a tooth of a sector gear generated by a cutter having the same tooth as said inner tooth, and two outer teeth formed respectively on said second and third longitudinal lines symmetrically with respect to said center line and having the same addendum as said addendum of said inner teeth, the distance of the tooth crest of each of said outer teeth from said first longitudinal line being larger than said addendum of said inner teeth and being selected to limit below a predetermined extent undercut created in the root of a tooth of a sector gear generated by a cutter having the same tooth as said outer tooth.

5. A variable ratio steering gear for a motor vehicle, comprising a worm shaft having a worm, a nut on said worm shaft in engagement with said worm for axial movement thereon upon rotation of said worm shaft and having a rack on one side, a rock shaft extending transversely to said worm shaft, and a sector gear mounted on said rock shaft and having teeth in engagement with the teeth of said rack, said teeth of said rack being formed on a stepped reference line different from basic pitch curve of said rack, said stepped reference line comprising a first straight longitudinal line extending from a center line of said rack in opposite directions and in parallel with the axis of said worm shaft and symmetric with respect to said center line and touching at said center line said basic pitch curve of said rack, two straight step lines extending respectively from both ends of said longitudinal line perpendicularly to the same and away from said axis of said worm shaft and having the same length, and second and third straight longitudinal lines extending respectively from leading ends of said step lines in parallel with said first longitudinal line and away from the same, said teeth of said rack comprising two inner teeth formed on said first longitudinal line symmetrically with respect to said center line and having the same addendum selected to limit below a predetermined extent undercut created in the root of a tooth of a sector gear generated by a cutter having the same tooth as said inner tooth, and two outer teeth formed respectively on said second and third longitudinal lines symmetrically with respect to said center line and having the same addendum as said addendum of said inner teeth, the distance of the tooth crest of each of said outer teeth from said first longitudinal line being larger than said addendum of said inner teeth and being delected to limit below a predetermined extent undercut created in the root of a tooth of a sector gear generated by a cutter having the same tooth as said outer tooth, each of said inner and outer teeth having inner and outer flat tooth surfaces, the pressure angles of said inner and outer tooth surfaces of each of said inner teeth and said outer tooth surface of each of said outer teeth being larger than the pressure angle of said inner tooth surface of each of said outer teeth and the pressure angle of said inner tooth surface of each of said outer teeth being considerably small.

6. A variable ratio steering gear as claimed in claim 5, in which said teeth of said rack are formed with equal pitch and chordal thickness.

* * * * *